(12) United States Patent
Brasier et al.

(10) Patent No.: US 8,748,746 B2
(45) Date of Patent: Jun. 10, 2014

(54) CABLE-RACEWAYS

(75) Inventors: Daniel Brasier, Ascot (GB); Alan Riddell, Maldenhead (GB)

(73) Assignee: Icore International Limited, Slough, Berkshire (GB)

( * ) Notice: Subject to any disclaimer, the term of this patent is extended or adjusted under 35 U.S.C. 154(b) by 136 days.

(21) Appl. No.: 13/394,469

(22) PCT Filed: Sep. 7, 2010

(86) PCT No.: PCT/EP2010/063134
§ 371 (c)(1),
(2), (4) Date: May 4, 2012

(87) PCT Pub. No.: WO2011/027002
PCT Pub. Date: Mar. 10, 2011

(65) Prior Publication Data
US 2012/0205134 A1 Aug. 16, 2012

(30) Foreign Application Priority Data

Sep. 7, 2009 (GB) .................................. 0915552.4

(51) Int. Cl.
*H02G 3/04* (2006.01)
*H02G 3/08* (2006.01)
*H02B 1/40* (2006.01)
*H02G 3/22* (2006.01)

(52) U.S. Cl.
USPC ........... 174/68.3; 174/481; 174/503; 174/505

(58) Field of Classification Search
USPC ................................ 174/68.3, 481, 503, 505
See application file for complete search history.

(56) References Cited

U.S. PATENT DOCUMENTS

| | | | | |
|---|---|---|---|---|
| 1,961,845 A | * | 6/1934 | Dodge | .......................... 428/105 |
| 4,804,806 A | * | 2/1989 | Orr et al. | .................. 174/117 M |
| 6,476,323 B2 | * | 11/2002 | Beebe et al. | ................. 174/72 A |
| 6,545,219 B1 | * | 4/2003 | Bukovnik et al. | ........... 174/74 A |
| 6,706,968 B2 | * | 3/2004 | Yaworski et al. | ........... 174/74 A |
| 2002/0117321 A1 | | 8/2002 | Beebe et al. | |
| 2007/0210490 A1 | * | 9/2007 | Malloy et al. | .................. 264/425 |
| 2008/0115960 A1 | * | 5/2008 | Bedingfield et al. | ........ 174/117 F |
| 2008/0156529 A1 | * | 7/2008 | Charon et al. | .............. 174/99 R |
| 2008/0296037 A1 | * | 12/2008 | Burland et al. | .................. 174/36 |

FOREIGN PATENT DOCUMENTS

| | | |
|---|---|---|
| DE | 23 47 501 A1 | 4/1975 |
| GB | 2 274 746 A | 8/1994 |
| WO | 02/068741 A2 | 9/2002 |

* cited by examiner

*Primary Examiner* — Jeremy C Norris
*Assistant Examiner* — Sherman Ng
(74) *Attorney, Agent, or Firm* — Davis & Bujold, PLLC; Michael J. Bujold

(57) ABSTRACT

A cable-raceway providing electromagnetic shielding has rectangular channels defined by longitudinal-folds of a tape which comprises mesh having a warp of bare wires running lengthwise and a weft of a single, bare-wire. Metal brackets support it with the base of each bracket extending transversely under the raceway. The channels nest between arms upstanding from the base, and a plastic insert fits over the tape to enhance electrical contact between the mesh and bracket for electrical ground-bonding of the raceway. The insert provides teeth down the walls of each channel for engagement by cable-retainers to push them down into the channels for retaining underlying cables. Further support in the channels is provided by plastic straps that extend under the raceway and to which the channels are secured using inserts and cable-retainers corresponding to the inserts and retainers. One face of the mesh is covered by an electrically-insulating sheet.

20 Claims, 8 Drawing Sheets

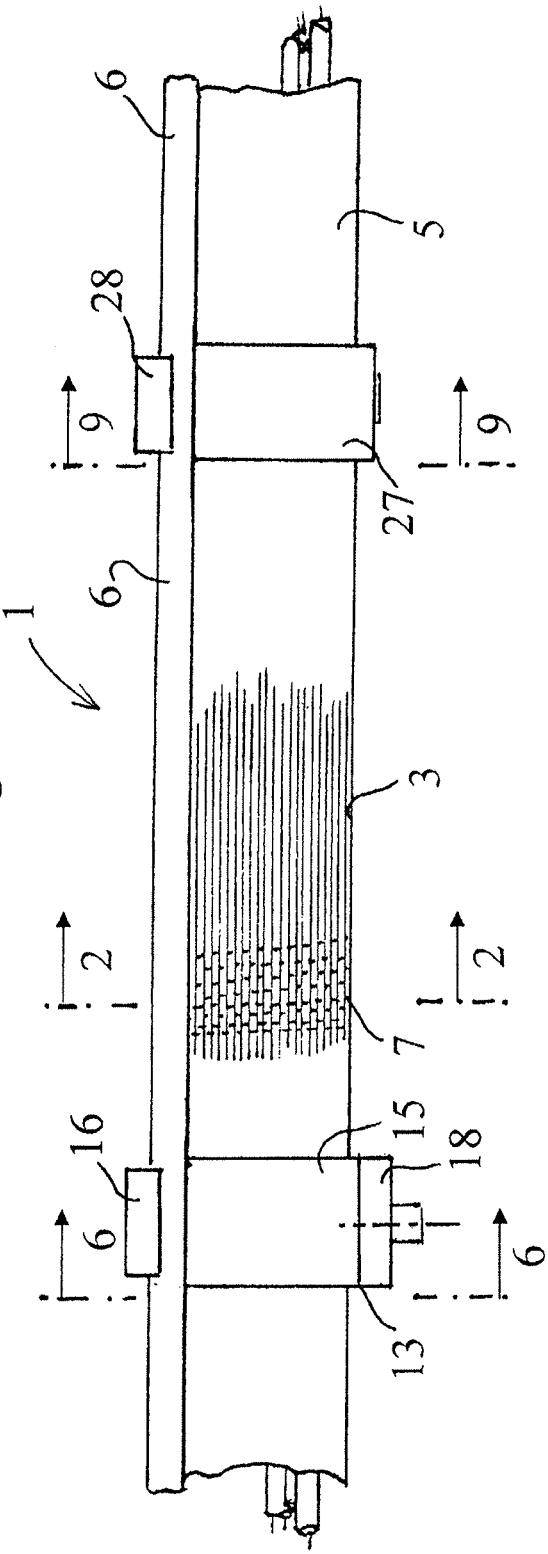

CABLE-RACEWAYS

This application is a National Stage completion of PCT/EP2010/063134 filed Sep. 7, 2010, which claims priority from British patent application serial no. 0915552.4 filed Sep. 7, 2009.

FIELD OF THE INVENTION

This invention relates to cable-raceways of the kind for support and routing of electrical, fibre-optic and other cables.

BACKGROUND OF THE INVENTION

Cable-raceways are conventionally provided in the form of metal channels within which the cables are retained for support and routing, for example within aircraft and other vehicle installations. The use of metal for the channels has the advantage of affording good physical support for the cables along their lengths and a degree of screening of them from external electromagnetic interference. The interference may be for example from lightning but may also be by induction from adjacent runs of electrical cable. Accordingly, although a raceway may be provided as a single channel it is conventional to route electrical cables between which there may be undesirable interference via different, parallel raceway-channels of a unitary, metal extrusion. Raceways constructed in this way provide good physical support but have the disadvantage that changes in direction and elevation of the cable-run can be accommodated only by fabricating specially-contoured channeling-sections adapted to the particular change required, and coupling them into the raceway between standard straight-sections. A further disadvantage arises in particular in aircraft installations where weight is a significant factor.

SUMMARY OF THE INVENTION

It is an object of the present invention to provide a form of cable-raceway by which these disadvantages can be to a large extent overcome.

According to the present invention there is provided a cable-raceway wherein a channel of the raceway is defined by an elongate tape that comprises an electrically-conductive mesh, the tape having longitudinal folds to define upstanding mutually-spaced side-walls of the channel.

The mesh may be a woven mesh that comprises electrically-conductive strands, and may have the warp of the woven mesh extending longitudinally of the channel. The weave may be a narrow-fabric weave, and the weft of the weave may involve a single unbroken electrically-conductive strand.

Also, the electrically-conductive strands may be individual wire-strands or a plurality of wire-strands twisted together, and the wire-strands which may be of nickel-coated copper, may be bare so that good electrical contact between all of them in common in the mesh.

The mesh may be covered fully or partially on one face, or if desired on both faces, with electrically-insulating material. In particular, the electrically-insulating material may be in the form of a plastics sheet that is secured (for example, by stitching or bonding) to the mesh within the channel to provide an electrically-insulating barrier between the mesh and the cables within the channel. The plastics material may be, for example, of polytetrafluoroethylene.

The cable-raceway according to the invention may comprise a plurality of parallel channels extending side by side with one another, the longitudinal folds of the tape defining in respect of each channel a bottom of the channel and mutually-spaced side-walls upstanding from the channel-bottom. Brackets, which may be of metal and located at intervals along the raceway, may provide for electrical ground-bonding of the raceway. Each bracket may have a base that extends transversely of the channels with the channel bottom of each individual channel secured to the base of that bracket and with arms upstanding from the base providing support for retention of the tape in its plural-channel configuration.

BRIEF DESCRIPTION OF THE DRAWINGS

Cable-raceways according to the present invention will now be described, by way of example, with reference to the accompanying drawings, in which:

FIG. 1 is a side elevation of a part of the length of a four-channel cable-raceway according to the invention used for routing electrical and/or fibre-optic cables in an aircraft or other installation;

FIG. 2 is a section of the cable-raceway taken on the line 2-2 of FIG. 1;

DETAILED DESCRIPTION OF THE PREFERRED EMBODIMENTS

Figure 3:
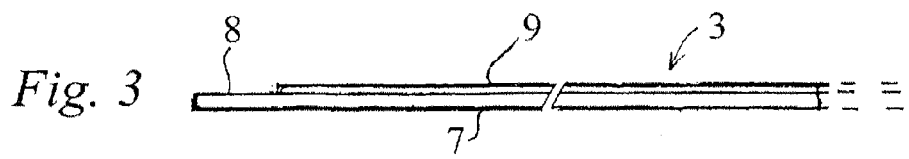
FIG. 3 is a representative cross-section of electromagnetically-shielding tape utilized in the fabrication of the raceway of FIG. 1.

Referring to FIGS. 1 and 2, the cable-raceway 1 of the example of the invention has four open-top channels 2 of rectangular section that are defined by a longitudinally-folded tape 3. The tape 3 (the woven nature of which is illustrated only partially in FIGS. 1 and 7 of the drawings) extends lengthwise of the raceway 1 and is folded longitudinally to form the bottom 4 and the two upstanding side-walls 5 of each channel 2 together with turned-over outer-rims 6 of the raceway 1. The structure of the woven tape 3 is as illustrated in FIGS. 3 and 4.

Figure 4:
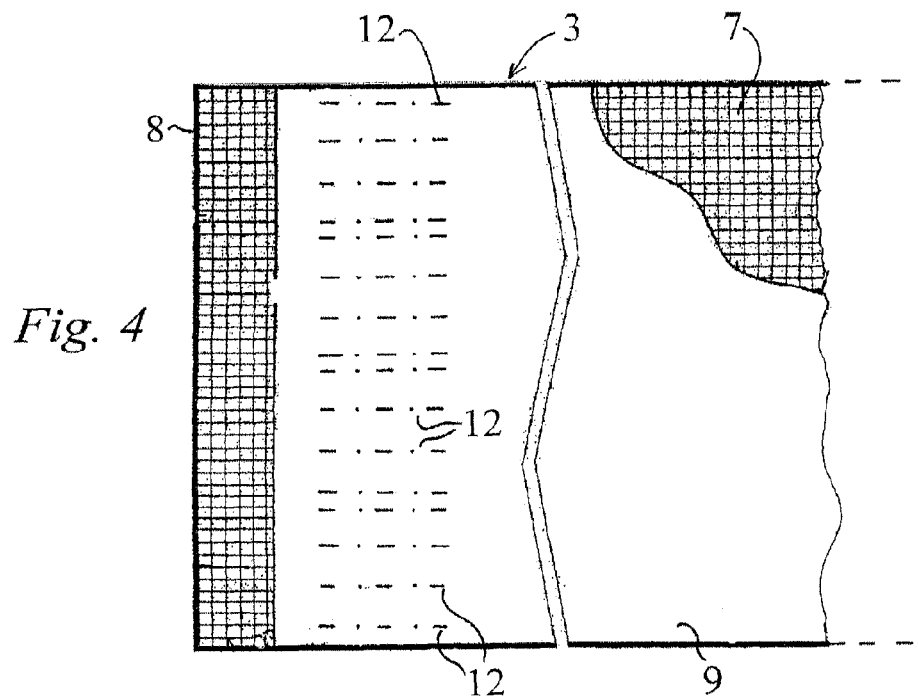
FIG. 4 is illustrative of a plan view of the tape of FIG. 3.

Referring to FIGS. 3 and 4, the tape 3 is of a lightweight construction that includes a woven mesh 7 of bare metal-wire strands (for example, in a twill weave). The mesh 7 is covered on one face throughout its length apart from within a marginal area 8 at each end, by an electrically-insulating sheet 9 of polytetrafluoroethylene that is bonded (it may alternatively be stitched) to the mesh 7.

Figure 5:
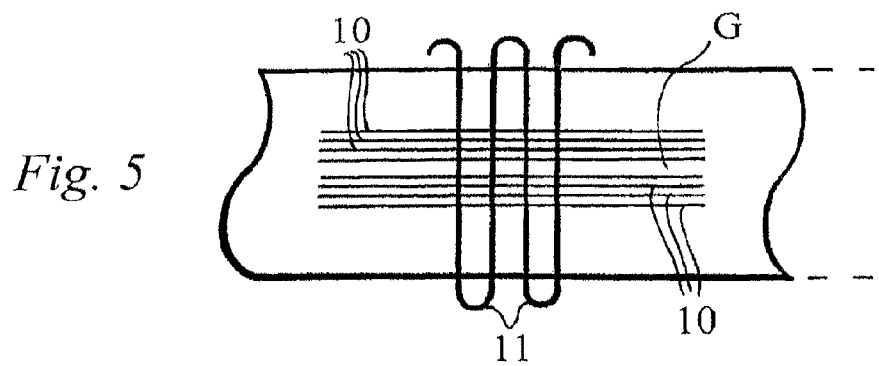
FIG. 5 is illustrative schematically of the weave of a wire-mesh that forms part of the tape of FIGS. 3 and 4.

As illustrated schematically in FIG. 5, the warp of the woven mesh 7 is formed by fine wire-strands 10 that run lengthwise of the tape 3, whereas the weft is formed by a fine wire-strand 11 (emphasized in the drawing) that runs back and forth without break, in a narrow-fabric weave with the warp strands 10. The strands 10 and 11 are, for example, single-wire-filaments or twisted pairs, of nickel-coated copper wire, and the strands 10 are fine enough that a group (in the case illustrated, of four) of them are drawn together through the dent space of the weaving loom; the gap G between the adjacent groups resulting from the dents (and shown exaggerated in FIG. 5), is small enough that it does not materially affect the shielding against electromagnetic interference provided. Depending on the weave pattern used, the weft strand 11 may, for example, pass successively over one group of warp strands 10 and under the next in the weave.

The tape 3 is folded on longitudinal fold-lines indicated by chain-dotted lines 12 in FIG. 4, to define the four interlinked channels 2 of rectangular cross-section illustrated by FIG. 2 with the electrically-insulating sheet 9 on the inside of each channel 2. The folded mesh 7 of woven wire retains the four-channel configuration into which it has been folded with a measure of both lateral and longitudinal rigidity. In this regard, however, support for retention of the tape 3 in its folded four-channel configuration laterally and for enhancing its load-carrying capacity longitudinally, as well as providing for ground-bonding of it electrically, is provided by metal brackets 13 (only one shown in FIG. 1) located at intervals along the length of the raceway 1.

Figure 6:
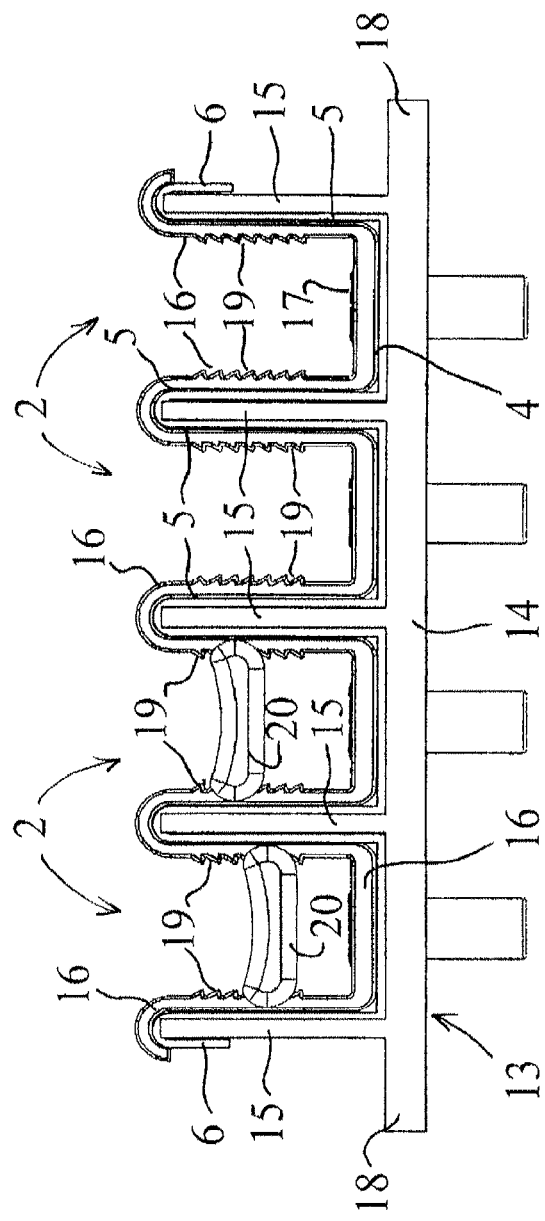
FIG. 6 is a representative cross-section of the raceway taken on the line 6-6 of FIG. 1 to show part of a typical electrical ground-bonding support-assembly of the raceway.
Figure 7:
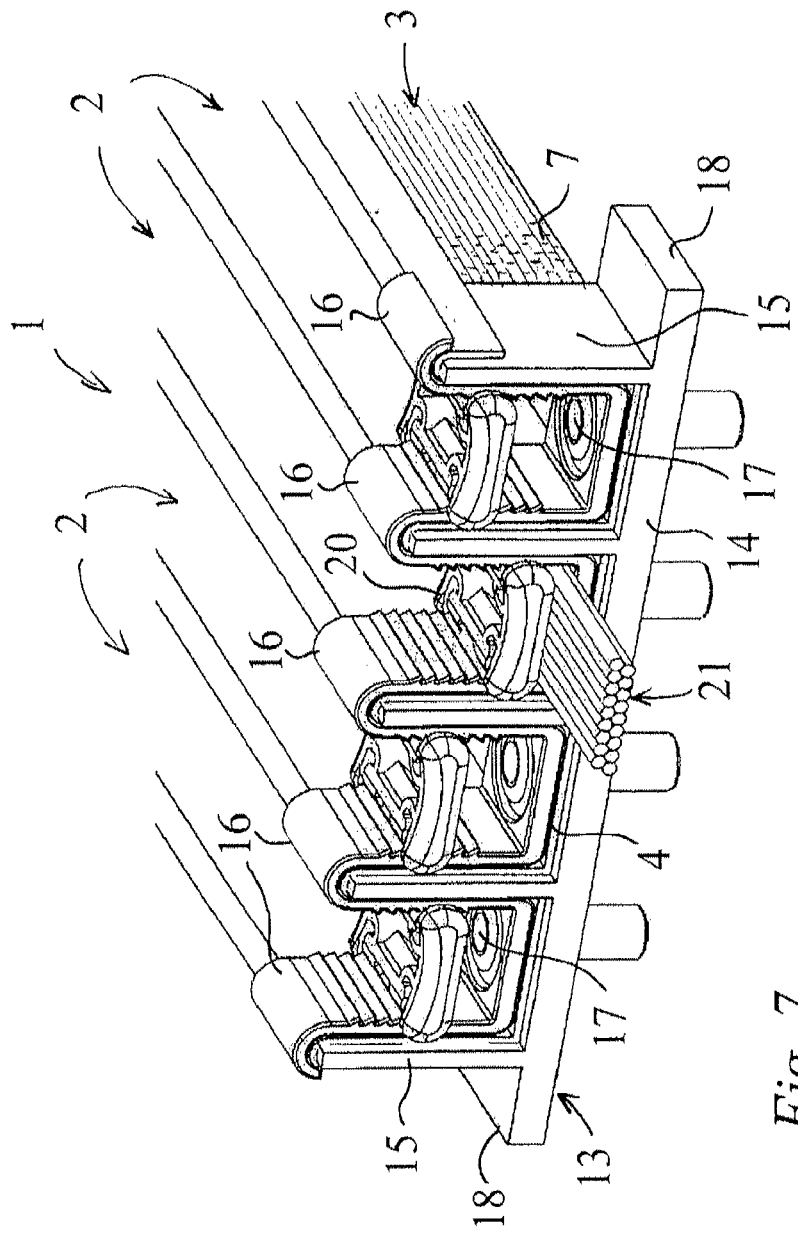
FIG. 7 is a perspective view from above of the four-channel cable-raceway of FIG. 1 when sectioned on the line 6-6 of FIG. 1 and showing the electrical ground-bonding support-assembly of FIG. 6.

As illustrated by FIGS. 6 and 7, the bracket 13 at each support-location has an elongate rectangular base 14 that extends transversely across the underside of the raceway 1 in abutment with the bottom 4 of each channel 2 and with the channels 2 nesting tightly between limbs or arms 15 upstanding from the base 14. This nesting holds the bare wire-mesh 7 of the tape 3 in both physical and electrical contact with the base 14 and the arms 15 of the bracket 13, and this contact is enhanced by a plastics insert 16 that fits resiliently over the tape 3 within the bracket 13 to bear on the tape 3 throughout its transverse contour within the bracket 13. A rivet 17 within each channel 2 clamps the insert 16 tightly to the base 14 of the bracket 13 with the bottom 4 of that channel 2 sandwiched between them. This and the resilient nature of the insert 16, ensures that there is good physical and electrical contact between the mesh 7 and the bracket 13 throughout the full width of the tape 3. Flanges 18 extending from opposite ends of the base 14 of each bracket 13 are used to mount the brackets 13 securely to individual electrical grounding points (not shown) of the installation.

As illustrated most clearly in FIG. 6, the insert 16 is formed with series of ratchet teeth 19 which extend down both sidewalls 5 within each channel 2 and are for engagement by respective cable-retainers 20 of the channels 2 (only two such retainers 20 are shown in FIG. 6). The cable-retainers 20 are for use as illustrated in the case of only one channel 2 in FIG. 7, for firm retention of cables 21 in that channel.

Figure 8:
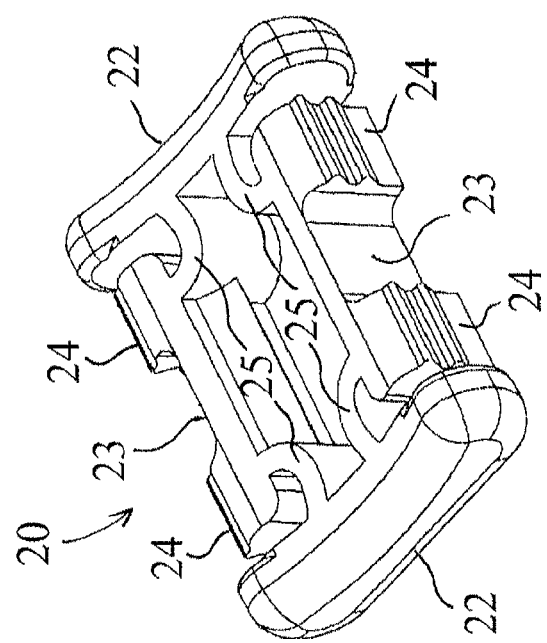
FIG. 8 is an enlarged perspective view of a typical cable-retainer used in the electrical ground-bonding support-assembly of FIGS. 6 and 7.

Each retainer 20, which is of molded plastics, is of the substantially-rectangular form shown in FIG. 8, for fitting longitudinally within its respective channel 2 with its two ends 22 extending transversely of that channel and its two sides 23 engaged on opposite sides of the channel 2 respectively with the ratchet teeth 19 there. The sides 23 each have two spaced sets of ratchet teeth 24 and are attached to both ends 22 by flexure joints 25 to enable the retainer 20 to be pushed down into its channel 2 with its teeth 24 engaging the teeth 19. Downward pressure on the retainer 20 causes the sides 23 to flex inwardly and allow the retainer 20 to be stepped downwardly by ratchet action onto the cables beneath. Release of the retainer 20 and withdrawal of it from the channel 2 is achieved using pliers to squeeze its two sides 23 towards one another and thereby release the teeth 24 from the teeth 19.

Figure 9:
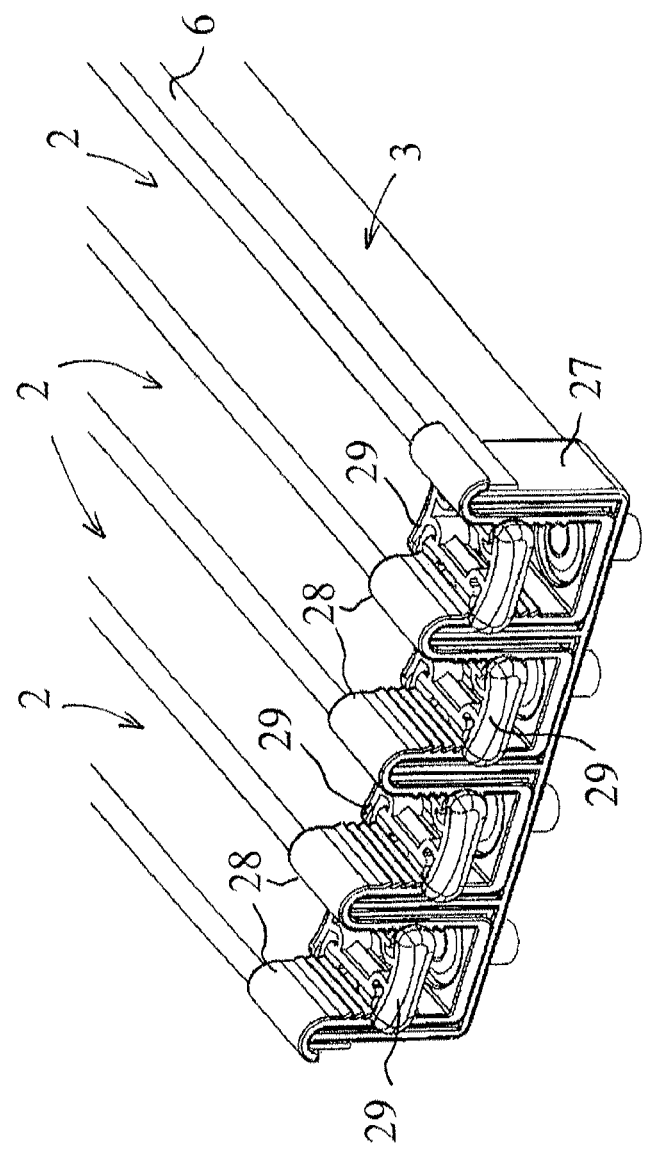
FIG. 9 is a perspective view from above of the four-channel cable-raceway of FIG. 1 when sectioned on the line 9-9 of FIG. 1 to show a typical intermediate support-assembly of the raceway.

As well as using the brackets 13 at spaced intervals along the raceway 1 for retention of the tape 3 in its folded four-channel configuration and enhancing its load-carrying capacity longitudinally, retention in that configuration may be achieved to the same effect intermediate the ground-bonding brackets 13 as illustrated in FIG. 9.

Referring to FIG. 9, the tape 3 in this case is sandwiched at the intermediate location between an external transversely-extending plastics strap 27, and an insert 28 of the same form as the insert 16 used with the bracket 13. The insert 28 is riveted to the strap 27 through the bottom 4 of each channel 2, and retainers 29 of the same form as the retainers 20 of FIG. 7, are used for cable-retention.

The use of the flexible woven-tape 3 to define the channels 2 of the raceway 1 has the advantage that changes in direction of the raceway can be achieved simply by bending and without the need to break the run to insert a specially-configured section. The bending of the raceway 1 to effect a change of elevation may be achieved by bending it to incline upwardly or downwardly in the plane of FIG. 1 (for example to enable the raceway to cross-over another raceway or obstacle), and similarly, a change of direction in azimuth may be achieved by bending it into or out of the plane of FIG. 1. The woven mesh 7 of the tape 3 readily accommodates all such bending within the weave without any relevant distortion, and the use of support-assemblies of the form illustrated in FIG. 7 can be used to maintain the bend and channel-configuration. Intermediate support-assemblies of the form illustrated in FIG. 9 may also be used to maintain and restore desired channel-configuration elsewhere.

Furthermore, as well as accommodating bends for changes of elevation and azimuth, the raceway of the invention may readily accommodate twisting along its length for changes of plane of the channels 2.

Accordingly, the flexibility of the woven structure allows a single tape 3 to be used for the full length of the cable-run required, without having to couple tapes together end to end. Where however, there is a need to couple tapes together end-to-end, this may be readily carried out as illustrated in exploded form by FIG. 10.

Figure 10:
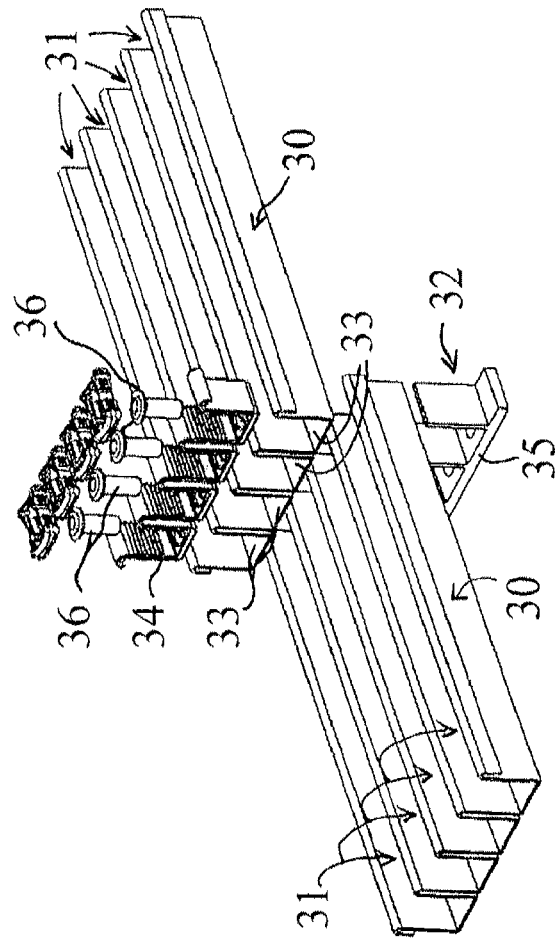
FIG. 10 is an exploded view illustrating intercoupling of woven tapes together into a raceway according to the invention.

Referring to FIG. 10, two woven tapes 30, each folded correspondingly into four channels 31, are coupled together end-to-end using a ground-bonding support-assembly 32 of the form illustrated in FIG. 7. In this, the bare end 33 of one tape 30 is inserted into the bare end 33 of the other tape 33 and the two sandwiched together one upon the other between an insert 34 corresponding to the insert 16 of FIG. 7, and a metal bracket 35 corresponding to the bracket 13 of FIG. 7. Rivets 36 secure the tapes 30 fast together and to the mounting bracket 35 giving good structural and electrical connection and ground-bonding between them.

The cable-raceway 1 described above is effective to afford electromagnetic shielding for the cables contained in the individual channels 2. Where the height of the channel is three times its width, a significant degree of shielding from external sources of interference has been found to be good for up to a 60% cable-filling of the channel. Furthermore, provided cables filling the channel do not protrude from its open top, interference between adjacent channels can be avoided.

Although the tape 3 of the cable-raceway 1 described above is covered on one face by the electrically-insulating sheet 9, this covering and the insulation it provides within the channels 2, may be dispensed with. The mesh 7 may be bare or may be coated for example with nylon; a coating of this form can be used to add stiffness to the raceway and fill inter-strand gaps in the weave and reduce adhesion of debris.

Furthermore, it will be understood that the invention is not limited to the provision of a specific number of channels in that the number may be more than four and may be fewer, and indeed may be merely one.

Where strengthening of the woven tape used for the raceway is required, this may be achieved by the introduction of additional strands of metal, plastics or fibre into the weave (weft or warp). Moreover, the introduction of additional strands may be distributed across the width of the tape, but may also be in groupings at individual locations as illustrated in FIGS. 11 and 12.

Figure 11:
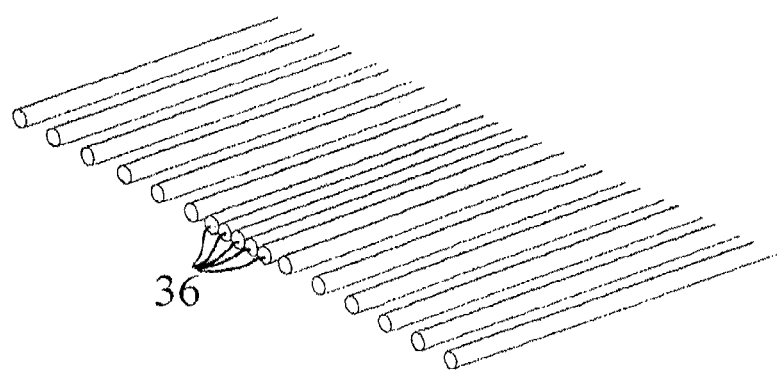
FIGS. 11 and 12 are illustrative of respective warp patterns that may be adopted for tape weaving in the construction of raceways according to the invention.
Figure 12:
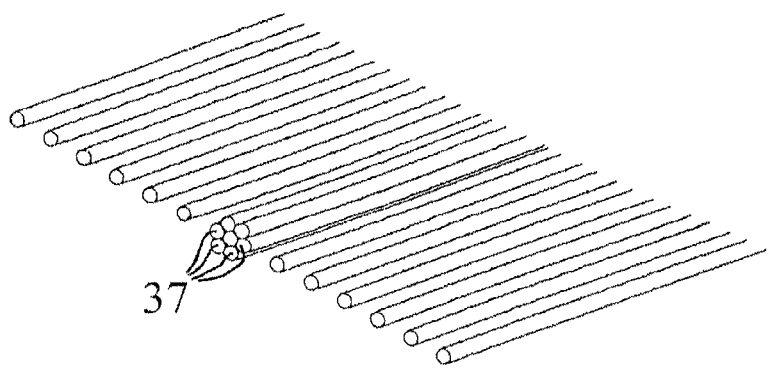

In FIG. 11 additional warp strands 36 are shown bunched together within one area across the width of the weave, whereas in FIG. 12, additional warp strands 37 are shown bunched one upon the other at one location across the width.

Where break out of cabling from the raceway is required, this may be achieved simply by feeding the cabling out from between two closely-located support-assemblies that are of either of the forms illustrated in FIGS. 7 and 9. Similarly, where cabling is to be added into the raceway this may be achieved by feeding it into the raceway between two closely-located support-assemblies of either of those forms.

The invention claimed is:

1. An elongate cable-raceway having an open-top channel for support and routing of cables, wherein:
   the open-top channel has a bottom and mutually-spaced sidewalls upstanding from the bottom of the channel;
   the open-top channel is defined by an elongate tape comprising an electrically-conductive mesh; and
   longitudinal folds in the elongate tape delineate the bottom of the channel and the mutually-spaced sidewalls upstanding from the bottom of the channel; and wherein the cable-raceway includes brackets secured to the bottom of the channel at spaced intervals from the one another lengthwise of the cable-raceway for supporting the channel nesting between upstanding arms of the brackets.

2. The cable-raceway according to claim 1, wherein the mesh comprises a woven mesh, and the woven mesh comprises a weave of electrically-conductive strands.

3. The cable-raceway according to claim 2, wherein the woven mesh has a warp that extends longitudinally of the channel.

4. The cable-raceway according to claim 3, wherein the woven mesh has a weft comprising a single electrically-conductive strand.

5. The cable-raceway according to claim 2, wherein each of the electrically-conductive strands is one of a plurality of individual wire-filaments and a plurality of wire-filaments twisted together.

6. The cable-raceway according to claim 2, wherein the electrically-conductive strands are bare strands establishing electrical contact between all of them in common in the mesh.

7. The cable-raceway according to claim 2, wherein the woven mesh comprises a weave of electrically-conductive strands and additional strands of one of metal, plastics and fibre.

8. The cable-raceway according to claim 7, wherein the additional strands are grouped together in at least one location within the weave of the mesh.

9. The cable-raceway according to claim 2, wherein the woven mesh has a covering of electrically-insulating material at least within the channel.

10. An elongate cable-raceway having a plurality of parallel channels extending side by side with one another in a plural-channel configuration for support and routing of cables, wherein:
    each channel has a bottom and mutually-spaced sidewalls upstanding from the bottom;
    the plurality of parallel channels are defined by an elongate tape that extends lengthwise of the cable-raceway,
    the tape comprises an electrically-conductive woven mesh folded into the plural-channel configuration, the electrically-conductive woven mesh comprising a weave of electrically-conductive strands; and wherein
    longitudinal folds spaced from one another widthwise of the elongate tape delineate the bottom and mutually-spaced sidewalls of the plurality of channels respectively of the plural-channel configuration of the electrically-conductive woven mesh.

11. The cable-raceway according to claim 10, wherein the woven mesh has a warp that extends longitudinally of the channels.

12. The cable-raceway according to claim 11, wherein the woven mesh has a weft comprising a single electrically-conductive strand.

13. The cable-raceway according to claim 10, wherein the electrically-conductive strands are bare strands establishing electrical contact between all of them in common in the woven mesh.

14. The cable-raceway according to claim 10, including straps located at intervals along the raceway, wherein each strap extends transversely of the channels under the electrically-conductive woven mesh, and the bottom of each channel is secured to the strap for retention of the electrically-conductive woven mesh in the plural-channel configuration.

15. A cable-raceway having a channel for support and routing of cables, wherein:
    the channel has upstanding mutually-spaced sidewalls;
    the channel is defined by an elongate tape comprising an electrically-conductive mesh; and
    longitudinal folds in the elongate tape delineate the upstanding mutually-spaced side-walls of the channel;
    wherein ratchet teeth extend down the sidewalls of the channel into the channel, and at least one cable-retainer engages resiliently with the ratchet teeth for step-wise insertion down into the channel onto underlying cables in the channel for retention of the underlying cables in the channel.

16. A cable-raceway having a plurality of parallel channels extending side by side with one another in a plural-channel configuration for support and routing of cables, wherein:
    each channel has a bottom and mutually-spaced sidewalls upstanding from the bottom;
    the plurality of parallel channels are defined by an elongate tape that comprises an electrically-conductive woven mesh folded into the plural-channel configuration, the electrically-conductive woven mesh comprising a weave of electrically-conductive strands; and
    longitudinal folds in the elongate tape delineate the bottom and mutually-spaced sidewalls of each channel in the plural-channel configuration of the electrically-conductive woven mesh;
    wherein brackets are located at intervals along the cable-raceway, each bracket comprising:

a base that extends transversely of the channels with the bottom of each individual channel secured to the base of the bracket, and arms upstanding from the base supporting retention of the woven mesh in the plural-channel configuration.

17. The cable-raceway according to claim 16, wherein the base of each bracket is electrically conductive, and the bottom of each individual channel is in electrical connection with the base of each bracket for electrically grounding the woven mesh to the base of the bracket via the bottom of each channel.

18. The cable-raceway according to claim 17, wherein the channels defined by the elongate tape nest between individual pairs of arms upstanding from the base of each bracket.

19. The cable-raceway according to claim 18, wherein an individual insert fits resiliently over the elongate tape at each bracket, the insert bearing on the elongate tape throughout the transverse contour of the elongate tape into each channel at the bracket.

20. A cable-raceway having a plurality of parallel channels extending side by side with one another in a plural-channel configuration for support and routing of cables, wherein;

each channel has a bottom and mutually-spaced sidewalls upstanding from the bottom;

the plurality of parallel channels are defined by an elongate tape that comprises an electrically-conductive woven mesh folded into the plural-channel configuration, the electrically-conductive woven mesh comprising a weave of electrically-conductive strands; and longitudinal folds in the elongate tape delineate the bottom and mutually-spaced sidewalls of each channel in the plural-channel configuration of the electrically-conductive woven mesh;

the cable-raceway further including ratchet teeth extending down the side-walls of each channel into the channel, and cable-retainers engage resiliently with the ratchet teeth of respective ones of the channels for step-wise insertion down into those individual channels for retention of underlying cables therein.

* * * * *